Patented Dec. 17, 1946

2,412,586

UNITED STATES PATENT OFFICE 2,412,586

GRINDING OF RUBBER SCRAP

Thomas M. Knowland, Belmont, Mass., assignor to Boston Woven Hose & Rubber Company, Boston, Mass., a corporation of Massachusetts No Drawing. Application August 20, 1943, Serial No. 499,407

1 Claim. (Cl. 241—16)

This invention relates to the grinding of rubber scrap, and more particularly to the fine grinding of rubber scrap with screening of the finely ground material and return of the coarser material for further grinding in a cyclic manner.

The present invention enables rubber scrap to be ground rapidly with high grinding and screening efficiency and with avoidance of difficulties in grinding commonly heretofore experienced.

As a preliminary to the reclaiming of rubber scrap it has been the practice in the trade to grind or reduce the particle size of the rubber scrap so that it may be more readily and uniformly reacted upon by chemicals used in the various reclaiming processes. With large pieces of scrap rubber, these must be first reduced in size as by passing them through a chopping machine. The grinding is usually accomplished by means of either smooth or corrugated rolls, usually running at an uneven rate of speed. A portion of the material passing through the grinding mill is at once reduced to the required size; but a large proportion of it must be recirculated through the mill for further grinding. The finely ground particles are commonly removed by screening through a shaker screen of, e. g., 6 to 16 mesh and the oversize returned to the grinding mill. In this process, as commonly carried out, raw rubber is continuously fed, with preliminary chopping if necessary, to the grinding mill and admixed with the recirculating oversize, and the finely ground rubber is continuously removed by the screening operation.

While hard, heavily compounded scrap rubber grinds comparatively easily, that is, at a high rate of speed, and the ground material presents a granular consistency such that screening efficiency is high, the grinding of soft stock, of high rubber content, is slow and difficult. In the case of stocks of high rubber content, or stocks which are greatly softened by the heat of grinding, the ground material tends to coalesce into lumps which retain the fine particles and which pass over the screen without separating the fine, ground particles from the mass. Under these conditions the lumpy condition of the stock progresses until the grinding action falls off greatly or ceases altogether.

The present invention is based upon the discovery that such difficulties in the fine grinding of soft stocks, or stocks of high rubber content, can be overcome or minimized, and such stocks easily ground and the finely ground particles readily separated by screening by the regulated addition of water in the grinding process. The improved process of the present invention enables the effective rate of grinding and screen separation of ground particles to be very greatly increased above the rate which has heretofore been possible by ordinary grinding processes.

The present invention makes possible and practical the fine grinding in commercial quantities and to a very fine mesh of the higher grades of rubber which are better adapted for use in the various reclaiming processes requiring a fine particle size.

The improved process of the present invention is a cyclic process in which the rubber stock, with preliminary chopping if necessary, is continuously fed to a grinding mill together with a regulated amount of water and there subjected to the grinding operation in the presence of the added water, the resulting ground stock passed by a conveyer to a screen for screening out the fine particles, and the oversize material from the screen returned to the grinder for further grinding. The effective grinding and removal of fine particles makes possible a continuous cyclic operation, with continuous addition of raw material and continuous removal of finely ground stock at the same rate and with an effective over-all grinding capacity.

The scrap rubber which is subjected to treatment according to the present invention should be free from cotton or other textile fibers as such since any appreciable quantities of fiber of sufficient length tends to clog up the screens used in separating the finely ground scrap from those particles only partially reduced in size. Wet fibers tend to felt together tightly and to clog up the openings of the screen. Accordingly such fiber-containing scrap cannot be advantageously ground by the present process. Scrap containing quantities of so-called rag stock or textile fibers already finely ground prior to incorporation into the original rubber articles presents no such difficulty and is well adapted for grinding by the present process.

Typical rubber scraps which may be advantageously subjected to the wet grinding process of the present invention include automobile inner tubes, miscellaneous molded scraps such as jar sealing rings, molded overflow and cutting wastes of various types. Soft rubber scraps, of high rubber content, and which are difficult to grind by present grinding processes can readily be ground by the present process. Similarly stocks which are softened by the heat of grinding such that they tend to coalesce into lumps by present methods of grinding can readily be ground to fine particle size by the present process.

The grinding mill used in the present process may be of the usual types with plain rolls or with one or more of the rolls deeply fluted. They may be run at even speed or more advantageously geared to run at an unequal speed; and the rolls may or may not be set tightly together.

It has been found, however, that the grinding can advantageously be carried out with the use of a mill having one roll corrugated and one roll smooth and with the rolls geared so as to yield a surface speed differential, the rear mill roll running faster than the front roll so as to yield a rubbing or grinding and pulling or tearing effect on the stock.

In carrying out the present process water at the temperatures at which it is ordinarily available in the plant is applied to the stock before it enters the grinding mill. This can advantageously be accomplished by spraying regulated quantities of water into the scrap as it is being fed to the mill so that water is present in sufficient quantities in the scrap as it passes through the mill.

The actual grinding of the rubber scrap is probably largely accomplished by the attrition effect of rubber particles against rubber particles in the bite of the mill rolls. In the present process, by spraying regulated quantities of water into the scrap before it is subjected to this attrition grinding, the tendency of the ground particles to cohere into lumps is minimized or entirely prevented so that the material remains at all times a mass of granular discrete particles. As a result, when this granular mass is subjected to screening on a vibrating screen, a high screening efficiency is obtained as well as a high rate of grinding efficiency. Fine particles are removed without subjecting them to further grinding and the coarser particles are kept separate so that further grinding can be readily accomplished.

In carrying out the process the use of an excessive amount of water should be avoided. If the amount of water is so great that the rubber particles form a slurry this will tend to clog the screen and reduce the screening and grinding efficiency. By limiting the amount of water, however, the ground mass can be maintained in the form of a mass of granular discrete particles readily adapted for handling on a conveyer belt and to screening to remove fine particles and subsequent further grinding of the coarser particles.

The amount of water required for most efficient grinding or screening varies somewhat with the type of scrap being ground. The amount of water required would also vary with the fineness to which the scrap is to be ground; grinding to a relatively coarse mesh does not require as much water as grinding to a relatively fine mesh. The amount should be sufficient to maintain the ground scrap in the form of a mass of granular discrete particles and to avoid the coalescing of the particles into lumps. On the other hand the amount of water should not be so great as to prevent the mass from remaining a mass of granular discrete particles and to convert the mass, e. g., into a slurry which would clog the screen. The proper amount of water to be added can readily be ascertained by visual observation of the ground stock and by avoiding too small an amount which would tend to cause coalescence of the ground particles and too large an amount which would tend to give excessive wetness.

In general, however, a few percent of water based on the weight of the stock being ground is sufficient. For example, in the case of inner tubes with a grinding mill having one plain and one corrugated roll, the continuous addition by spraying of an amount of water equal to from 3 to 5% of the weight of the scrap ground gave very satisfactory results. In grinding hard mechanical scrap an amount of water equal to around 2 to 3% of the total weight of the rubber ground was found advantageous. The exact amount required will, as above pointed out, vary somewhat with different stocks and with the fineness of grinding and to some extent with the type of grinding mill used.

While I do not wish to limit myself by any theoretical explanation of the action of the water in the process, I am led to believe that its action is partly one of lubrication of the rubber particles where the grinding is accomplished by the attrition effect of rubber particles against rubber particles in the bite of the mill rolls; in part a cooling effect; and in part a modifying effect on the rubber particles; but whatever may be the explanation of the action of the water it is effective in facilitating the production and separation of fine particles and in preventing the cohesion of the ground particles so that the material remains at all times a mass of granular discrete particles such that a high screening efficiency can be maintained. It is one advantage of the present process that it can be carried out with cooling water at the temperatures at which it is available in the mill or factory where the rubber is being ground.

The present process has the further advantage that it can readily be carried out in existing mill equipment with a simple added expedient of adding a regulated amount of water to the stock being ground. This can readily be accomplished by spraying the water onto the stock continuously as it is fed to the grinding mill and with regulation of the amount of spray to give the desired granular condition of the ground mass of scrap particles such that they can be readily screened to remove the desired fine particles before returning the oversize particles for further grinding.

The process of the present invention is particularly advantageous, as above pointed out, for the grinding of high grade scrap, such as inner tubes, etc., to prepare the scrap for reclaiming. Such finely ground, high grade scrap is more advantageously used in reclaiming processes than coarser particles, but has been difficult to produce by existing grinding processes. The present process not only enables fine grinding of the rubber scrap to be readily accomplished, but enables a greatly increased effective rate of grinding and screen separation to be accomplished.

The finely ground scrap, produced by the present process, will contain the added water to a greater or less extent intimately combined or associated therewith, but this wet, finely ground scrap can readily be dried in a drier to remove the water and prepare it for use in a dry state for reclaiming or plasticizing processes where dry stock is desired. The wet scrap can be directly used for reclaiming or plasticizing by processes where the presence of water does not interfere with the further treatment of the rubber.

I claim:

· The improvement in the fine grinding of rubber scrap which is free from fibrous material in a cyclic manner with continuous addition of fresh scrap and continuous removal of the finely ground rubber from the cyclic operation and recycling of the oversized particles for further grinding, which comprises adding from about 2% to about 5% of cooling water to the rubber to be ground, subjecting the rubber wetted with the water added thereto to compressive and pulling forces between relatively-moving spaced grinding surfaces sufficient to bring about a grinding and pulling apart of the rubber into discrete particles, screening the ground rubber to remove the finely ground particles of a size suitable for reclaiming processes, and recycling and regrinding the coarse particles with the addition of water before regrinding, the water added to the rubber preventing coalescence of the ground particles during the grinding operation, but not interfering with the screening of the ground rubber particles.

THOMAS M. KNOWLAND.